United States Patent
Bush

(10) Patent No.: US 7,113,493 B1
(45) Date of Patent: Sep. 26, 2006

(54) ACTIVE NETWORKING IN COMMUNICATION SATELLITES

(75) Inventor: Stephen Francis Bush, Latham, NY (US)

(73) Assignee: General Electric Company, Niskayuna, NY (US)

( * ) Notice: Subject to any disclaimer, the term of this patent is extended or adjusted under 35 U.S.C. 154(b) by 1044 days.

(21) Appl. No.: 09/584,955

(22) Filed: Jun. 2, 2000

(51) Int. Cl.
*H04B 7/204* (2006.01)
*H04L 12/28* (2006.01)
*H04L 12/56* (2006.01)
*H04J 3/16* (2006.01)
*H04J 3/22* (2006.01)

(52) U.S. Cl. .................... 370/325; 370/395.1; 370/469

(58) Field of Classification Search ................ 370/316, 370/325, 469, 254, 255, 395.1, 295.1
See application file for complete search history.

(56) References Cited

U.S. PATENT DOCUMENTS

| | | | | |
|---|---|---|---|---|
| 5,594,780 A | * | 1/1997 | Wiedeman et al. | 455/430 |
| 5,875,181 A | * | 2/1999 | Hsu et al. | 370/320 |
| 5,991,279 A | * | 11/1999 | Haugli et al. | 370/311 |
| 6,078,577 A | * | 6/2000 | Bishop et al. | 370/348 |
| 6,310,893 B1 | * | 10/2001 | Yuan et al. | 370/474 |
| 6,377,561 B1 | * | 4/2002 | Black et al. | 370/330 |
| 6,404,749 B1 | * | 6/2002 | Falk | 370/325 |
| 6,430,167 B1 | * | 8/2002 | Falk | 370/325 |
| 6,529,706 B1 | * | 3/2003 | Mitchell | 455/12.1 |
| 6,580,716 B1 | * | 6/2003 | Falk et al. | 370/396 |

OTHER PUBLICATIONS

"Architectural Framework for Active Networks," Author: Active Networks Working Group, DARPA Active Networks Program (http://www.darpa.mil/ito/research/anets/Arcdocs.html; Aug. 31, 1998, pp. 1-13.

"A Survey of Active Network Research," DL Tennenhouse; JM Smith; WD Sincoskie; DJ Wetherall; GJ Minden; IEEE Communications Magazine, vol. 35, Jan. 1997, pp. 1-14.

* cited by examiner

*Primary Examiner*—Huy D. Vu
*Assistant Examiner*—Blanche Wong
(74) *Attorney, Agent, or Firm*—Richard A. DeCristofaro; Patrick K. Patnode

(57) ABSTRACT

A communications network comprises a plurality of nodes including at least one earth station and at least one spacecraft. The spacecraft node is an active node of the network. A method for dynamically configuring a spacecraft to function as a node of a communications network in accordance with the defacto active network reference and with an Open Systems Interconnect (OSI) reference model comprises the step of transmitting an object from an earth station to the spacecraft. The object comprises at least one method for configuring the spacecraft to include a node operating system (nodeOS) and at least one execution environment (EE).

6 Claims, 3 Drawing Sheets

ACTIVE NETWORKING IN COMMUNICATION SATELLITES

BACKGROUND OF THE INVENTION

This invention relates to communications networks, and more particularly to data communications over satellite links.

In 1962 the American telecommunications giant AT&T launched "Telstar", the world's first true communications satellite. Since then, countless communications satellites have been placed into earth orbit, and the technology being applied to them is rapidly growing in sophistication. At the same time, many of today's communications satellites are designed to have operational lifetimes of more than a decade.

One problem associated with spacecraft-based communications equipment and networks is the rapid pace at which technology changes. In today's global networking landscape, there are many new, and rapidly evolving data transmission technologies, media and methodologies for transmitting data over a network. At the same time, satellites already in orbit are inaccessible for installing these upgraded technologies.

It is desirable to be able to incorporate any type of data transmission media into a network that includes a satellite. Since each type of media has different characteristics, systems and methods designed to facilitate seamless integration of satellite communication in hybrid systems despite differences in underlying system architectures are highly desirable. Therefore, a need exists for systems and methods for upgrading the technology of a satellite while the satellite is in orbit.

BRIEF SUMMARY OF THE INVENTION

A satellite network comprises a plurality of nodes including at least one earth station node and a satellite node. The satellite node is an active node of the network. A method for dynamically configuring a satellite to function as a node of a communications network in accordance with an Open Systems Interconnect (OSI) reference model comprises the step of transmitting an object from an earth station to the satellite. The object comprises at least one method for configuring the satellite to include a node operating system (nodeOS) and at least one execution environment (EE).

DETAILED DESCRIPTION OF THE INVENTION

For purposes of this specification, the following telecommunications terms are defined herein. The term "spacecraft" refers to any man-made vehicle that is intended to go beyond the major portion of the Earth's atmosphere. The term "satellite" refers to any body which revolves around another body of preponderant mass and which has a motion primarily and permanently determined by the force of attraction of that other body. The term "satellite communications" refers to a telecommunications service provided via one or more satellite relays and their associated uplinks and downlinks. The term "network" refers to an interconnection of three or more communicating entities. A "satellite network" refers to a satellite system or a portion of a satellite system, consisting of a satellite and its cooperating Earth stations. An "Earth station" is a station located either on the Earth's surface or within the major portion of the Earth's atmosphere and configured for communication with at least one other station. In one example an Earth station is configured for communication with a satellite station. In another example, an Earth station is configured form communication with at least one other Earth station by means of at least one object in space, for example, a reflecting spacecraft. A "station" refers to at least one transmitter, and in the alternative at least one receiver, and in the alternative a combination of transmitters and receivers, including the accessory equipment necessary at one location for carrying on a radio-communication service, including a space radio-communication service. A "space radio-communication service" is any radio-communication involving the use of one or more space stations or the use of one or more reflecting satellites or other objects in space.

For purposes of this specification the term "node" means any device capable of sending, receiving, or sending and receiving information within a network. For purposes of this specification the term "configured" means provided with appropriate components, the components being interconnected and programmed to cooperate in the performance of a given function. A "signal" is detectable transmitted energy that can be used to carry information. The term "information" refers to the meaning that a human assigns to data by means of the known conventions used in their representation. The term "information" also refers to unprocessed data of every description that is capable of being used in the production of intelligence.

Figure 1:
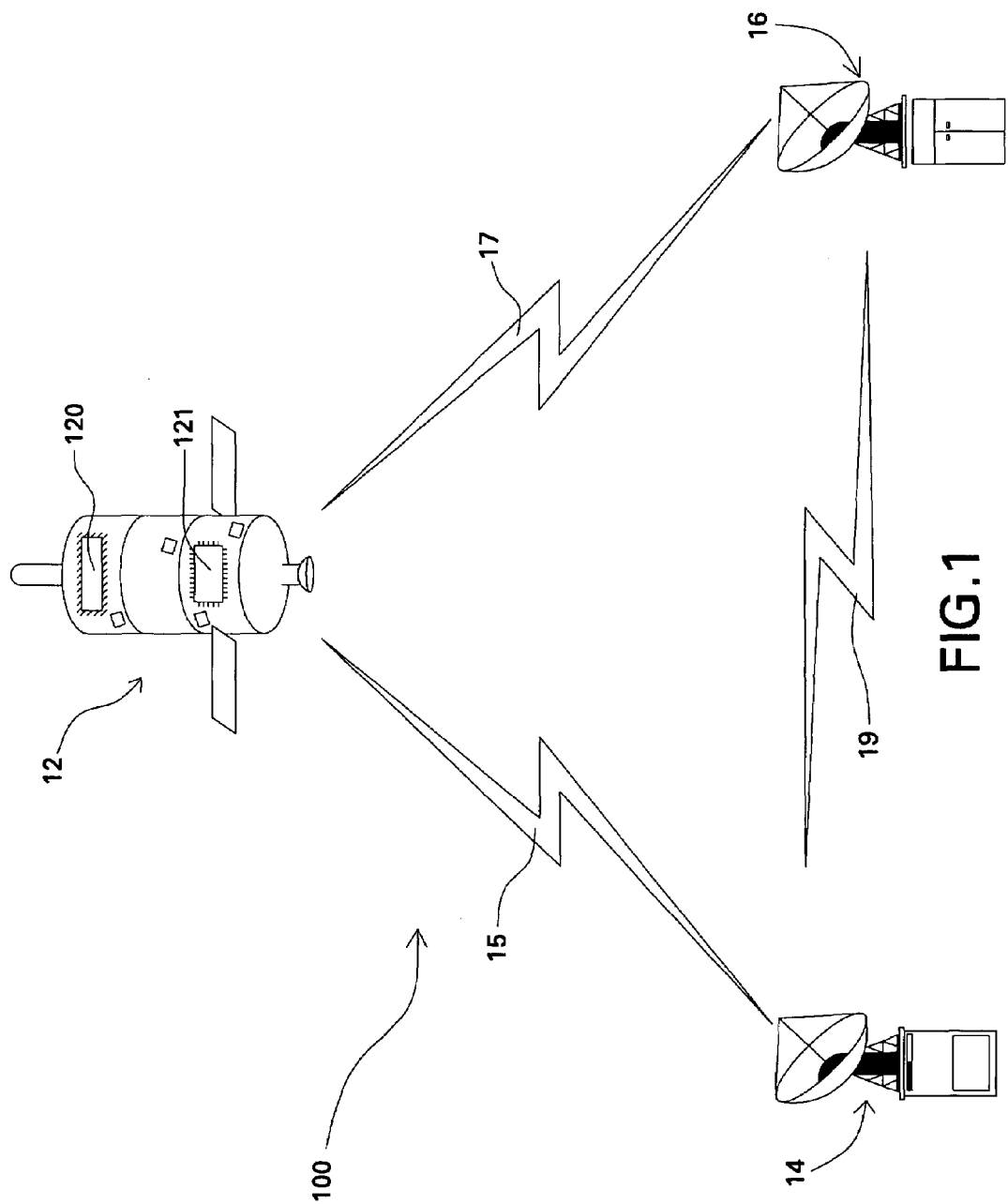
FIG. 1 is a simplified pictorial diagram of a satellite-based communications network in which information flows between earth stations and at least one satellite.

In FIG. 1, a communications network 100 comprises a plurality of stations, including at least one spacecraft 12 which provides communication between a plurality of earth stations 14 and 16, by way of a plurality of bi-directional communication links designated 15 and 17 respectively. In one embodiment of the invention, first earth station 14 and second earth station 16 are configured to communicate with each other by means of a terrestrial communication link 19. Terrestrial communication link 19 is selected from the group comprising Public Telephone Switched Network (PTSN) links, the Internet, and wireless communication links. As those of ordinary skill in the art will recognize, alternative embodiments of the invention include additional spacecraft, earth stations and communications links. Spacecraft 12 includes memory 120 in which data, information, program and commands may be temporarily or permanently stored and at least one processor 121 for executing computer programs.

Computer networks and their associated computer programs are typically described in terms of layers. In computer programming, the term "layering" refers to the organization of computer programs into separate program categories, each category including programs having steps that are performed sequentially and defined by specific interfaces for passing the result of the steps to the next program category, or layer, until the overall function, such as the sending or receiving of some amount of information, is completed.

One reference model for describing computer programs that communicate over a network is the Open System Interconnection (OSI) model. The OSI model is a layered set of protocols in which two nodes of a network, one at either end of a communications exchange, use corresponding sets of layers to organize the communication. The OSI reference model defines seven possible layers, each reflecting a different function to be performed in order for node-to-node communication to take place between computers to achieve an overall function.

Numerous standard communication protocols, e.g., TCP/IP are defined within the OSI reference model. These protocols are part of an international program to develop computer networking protocols and other standards that facilitate multi-vendor equipment interoperability despite differences in underlying architectures. For purposes of this specification, a "protocol" is the special set of rules for communicating that nodes of a network use when they send signals back and forth. The term "protocol stack" refers to the layers through which data passes at both the transmitter node and receiver node to carry out a data exchange.

A number of data transmission and communication protocols exist that utilize the OSI model as an overall framework. Protocols suitable for use in the invention are described in a variety of industry and international standards. These include, for example, the Internet Protocol (IP) and the asynchronous transfer mode (ATM) protocol. Still other protocols have been developed for other purposes, for example to exchange variable data rate information such as digitized video (high data rate), audio, or slower speed data.

Unfortunately, today's spacecraft are not typically configured for operation as nodes of a network. Further, they are not typically configured in accordance with an OSI reference model. Thus, their ability to support hybrid communications networks that rely on a variety of protocols is limited. It would be desirable to configure a spacecraft as a node of a communications network, and for communication with the spacecraft to take place in accordance with an OSI reference model while the spacecraft is in orbit. Further, once a spacecraft is configured to operate in accordance with an OSI reference model, it would be desirable to be able to switch the operation of the spacecraft from one OSI protocol to another while the spacecraft is in orbit.

The present invention relies upon object oriented programming (OOP) and active networking techniques to reconfigure extant communications hardware and software on board a spacecraft 12 while spacecraft 12 is in orbit. To accomplish this, at least one earth station node, e.g., earth station 14, is configured to transmit signals comprising "objects" to spacecraft 12 via at least one communication link, e.g. communication link 15. For purposes of this specification the term "object" is used in connection with OOP techniques. In that context, the term "object" typically refers to a collection of executable code and data that acts as a sender and receiver of messages. In accordance with typical object oriented programming techniques, messages define the interface to an object.

Figure 2:
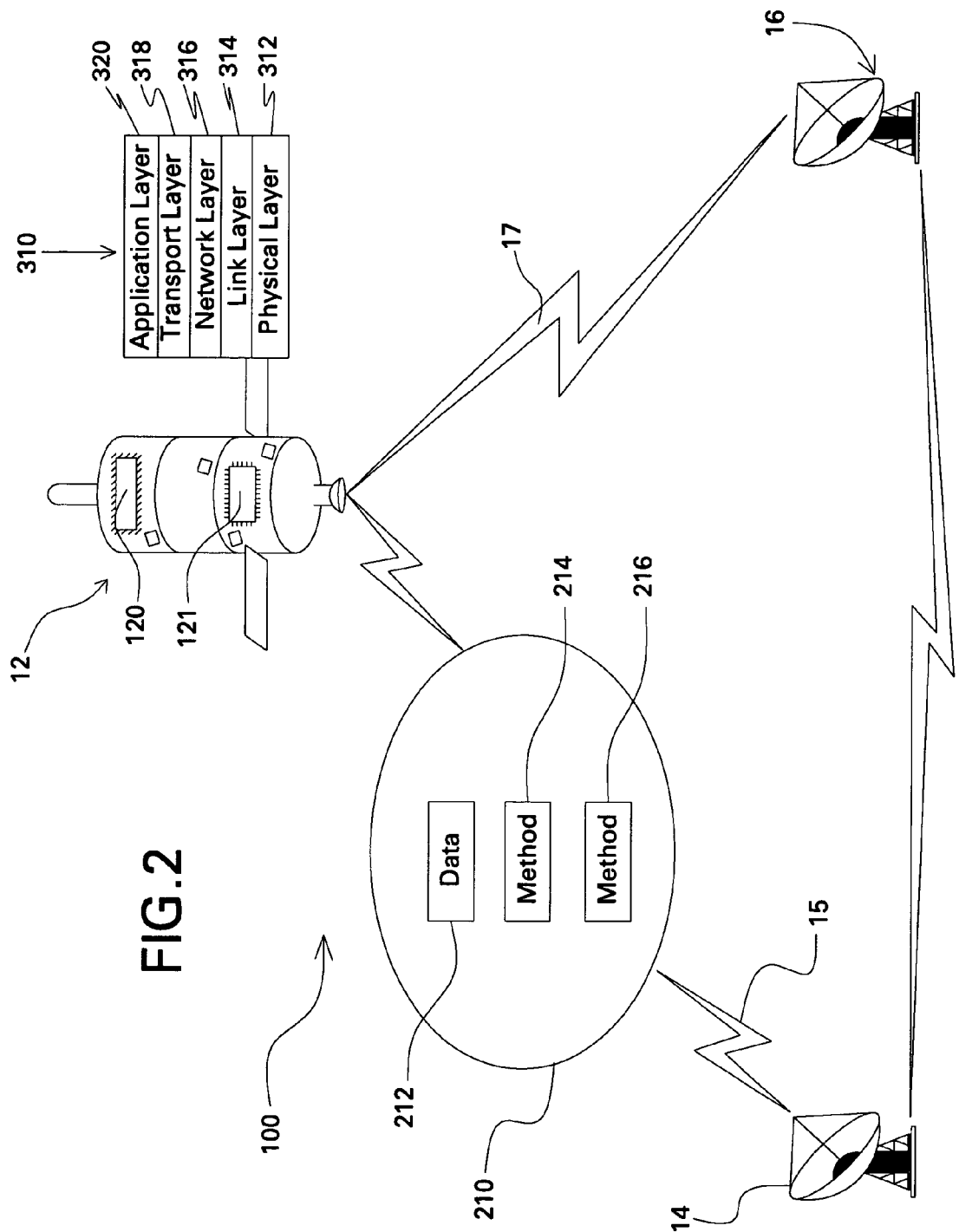
FIG. 2 is a diagram of an embodiment of the invention illustrating an example protocol stack of the communications portion of a satellite and a simplified representation of an object-oriented programming (OOP) object containing data and methods.

An example object transmitted to the spacecraft via radio frequency (RF) signal by at least one of earth stations 14 and 16 is conceptually illustrated in FIG. 2. The object of FIG. 2 is illustrated as an object circle 210, which encompasses data 212, and which also includes at least one method 214, which acts upon the data. For purposes of this specification the term "method" when used in reference to object oriented programming, means code that is executed when a message is received by an object. In one embodiment of the invention object 210 includes a plurality of methods, e.g., 214 and 216. In one embodiment of the invention, at least one method 214, 216, implements a protocol corresponding to data 212.

When received by spacecraft 12 processor 121 executes at least one method 214, 216 of object 210. According to one embodiment of the invention, execution of the method by processor 121 configures the extant communications hardware and software to conform to a physical layer 312 and a data link layer 314 according to an OSI reference model. Thus, the extant hardware and software of spacecraft 12 are dynamically reconfigured to support OSI modeled communications. In one embodiment of the invention, as a result of the execution of the received method, spacecraft 12 is configured to exchange information with earth station 14 in accordance with an OSI protocol selected from the group comprising the IP protocol and the ATM protocol.

In another embodiment of the invention, physical layer 312 and data link layer 314 are further configured to define an "active node". For purposes of this specification, an "active" node is a node comprising a node operating system (nodeOS) and at least one node execution environment EE. A nodeOS is responsible for allocating and scheduling the node's resources, e.g., link bandwidth, CPU cycles, and storage. In effect, a node EE implements a virtual machine that users can program or control by transmitting objects thereto. The EE interprets the objects delivered to it.

OSI architecture further defines additional layers. These additional layers typically comprise a network layer 316, which defines the complete routing path for data over multiple links, a transport layer 318 which defines at least network congestion control, and an application layer 320 which uses software-defined executable code for performing tasks relating to a particular application. In accordance with an embodiment of the invention, a signal comprises at least one object 210. The object includes at least one method 214, 216 which, when received and executed within the physical layer and link layer on board spacecraft 12, implements at least one additional OSI layer. For example, method 214, 216 implements network layer 316, of the OSI architecture stack illustrated in FIG. 2 on board spacecraft 12. In another embodiment of the invention, an object 210 includes at least one method for implementing a transport layer 316 on board spacecraft 12. In yet another embodiment of the invention, object 210 includes at least one method for implementing an application layer on board spacecraft 12.

FIG. 2 includes a representation of an OSI reference model protocol stack 310 as implemented on spacecraft 12 of FIG. 1 in accordance with an embodiment of the invention. The object 210 of FIG. 2 arrives at the physical layer 312 of stack 310 and proceeds up the stack. As previously described, the methods of object 210 are executed by processor 121 as it rises through the stack, until it reaches a relevant layer, such as, for example, the network layer. The methods, e.g., 214 and 216 contained within the object 210, are deposited in the relevant layer, where they replace the corresponding previously existing method.

For example, network layer 316 contains a current method implementing an asynchronous-transfer-mode (ATM)-like layer, which switches fixed-size ATM cells among ATM virtual circuits or output ports. This method is replaced by a newly arrived (and stored in memory) Internet Protocol (IP) method, which processes Internet protocol packets by examining the IP packet header, and determining the (IP terminology) destination channel. Other examples include new data protocols to be developed, that are desired to be distributed by spacecraft-based communications systems. Such new protocols are transmitted over the spacecraft-based communication system by changing the method within the network layer to accommodate the new protocol.

The data portion 212 of object 210, together with the attached protocol method, is routed through the physical layer 312 to downlink 17 for transmission to an earth station, e.g., 16. In one embodiment of the invention the uplinked data object 210 is initially routed to applications layer 320 of stack 310 for intelligent processing of the object 210, and for control of the other layers of the stack. In a particular embodiment of the invention the application layer 320 includes a Java Virtual Machine (JVM), and object 210 is a Java object.

Figure 3:
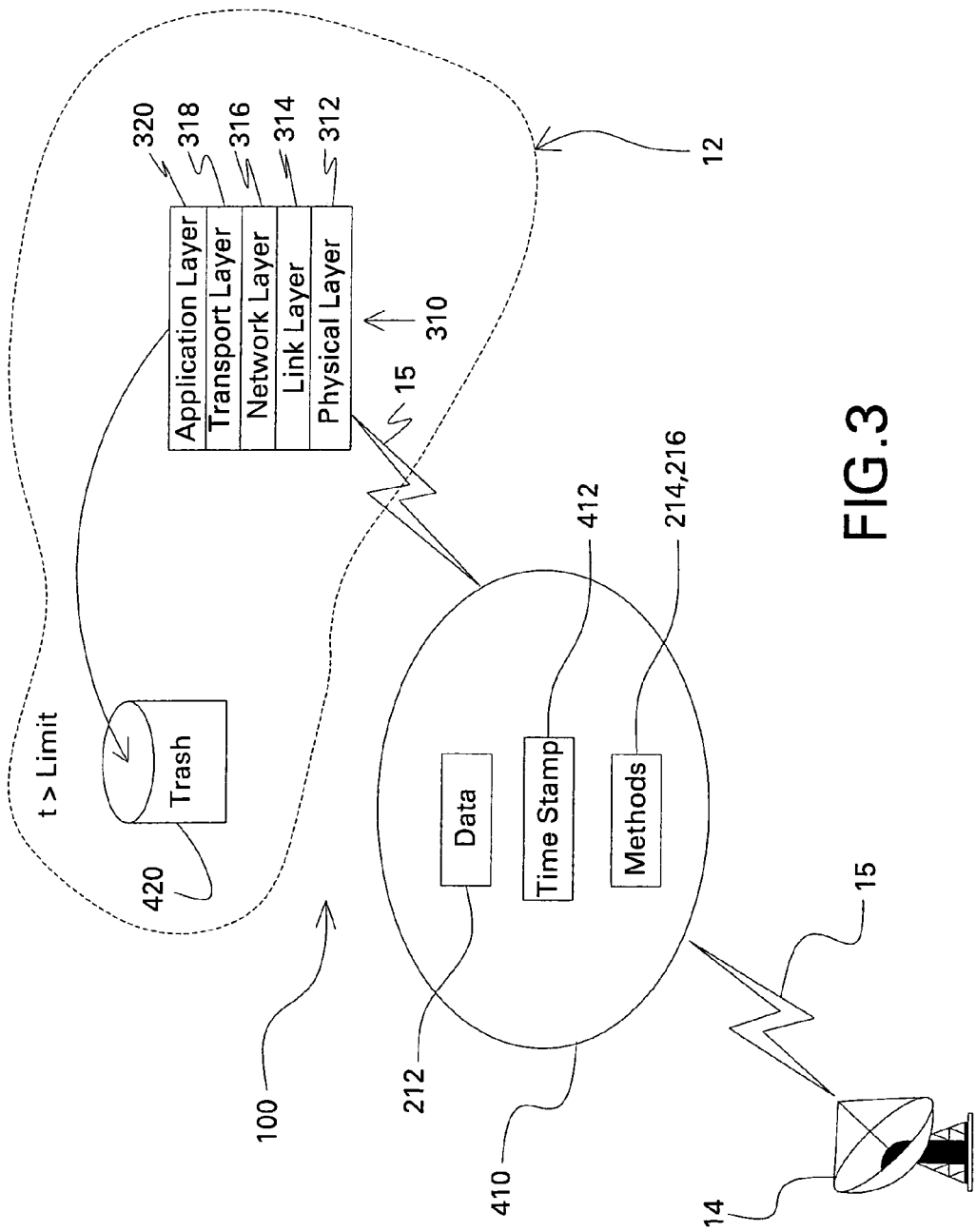
FIG. 3 is a simplified representation of a stack for illustrating operation of a system according to a packet dropping embodiment of the invention.

In FIG. 3, an object 410 is illustrated as including data 212 and methods 214, 216 as in the case of object 210 of FIG. 2, and further includes a time stamp designated 412, indicating the time at which the associated data must be received at the designated destination. The data, for example, is audio data transmitted in packets, which must arrive at the destination, preferably in a continuous stream, but at least with each packet arriving no later than the time at which it's information is to be converted into audio, so as not to disrupt the playback. In another example the data is video information with similar constraints. In FIG. 3, the object 410 arrives at the stack 310 of the spacecraft, and is routed to the application layer 320 as in the situation described in FIG. 2. The methods 214 and 216, are executed in the application layer 320. The methods compare the current time with the time stamp, and cause discard of the object 410 into a "trashcan" 420 if the time stamp is less than (<) or equal to the current time (indicating that the time designated for arrival is already past). If the comparison indicates that the time stamp is greater than (>) the current time, so that the time for its arrival at the destination has not passed, the application layer, under the control of the executable code, passes the information or object 410 to the downlink 17.

In another embodiment, the uplinked object is similar to that described above, but the method is one that affects the transport layer of the stack. As in the previously described operations, the object is routed to the application layer 320, and the packet is examined. The application layer recognizes that the method is a new or updated transport method. Consequently, the application layer replaces the transport method currently being used by the transport layer with the newly arrived transport method. When the transport layer controls the rate of packet flow through the network, it may be considered to be a congestion control process. Among the congestion control methods suitable for use in the invention are the "fast-restart" mechanism, the Reno and Vegas TCP control mechanisms, and the like. In accordance with the invention new control mechanisms are capable of being uplinked and used as appropriate.

It should be noted that the transport-layer function is especially important in spacecraft-based communication systems, because normal flow or congestion control mechanisms, intended for terrestrial use, tend to slow the packet flow rate in response to long delays between the time of transmission of a packet and the time of reception. In the context of a spacecraft-based communication system, a long delay is inherent in the path length. A conventional flow controller, if used in a spacecraft system, would interpret the delay as resulting from congestion, and reduce the packet flow rate. However, since the delay is not a function of congestion, this type of control simply introduces a maximum amount of buffering, and the lowest possible packet flow rate, without affecting the path delay. Thus, any improvements in the transport-layer functioning would result in improved communications operability. These improvements can be implemented on satellites or spacecraft in accordance with the invention.

Other embodiments of the invention will be apparent to those skilled in the art. For example, in the context of a multicast arrangement, the executable code associated with each object or piece of data can identify the destinations to which the spacecraft or another node is to transmit the object or its data. The term "multicast" refers to a networking technique that allows data, including data in packet form, to be simultaneously transmitted to a selected set of destinations.

Thus, a method according to an aspect of the invention dynamically configures a spacecraft 12 for providing communication between earth stations 14, 16, possibly by way of one or more additional spacecraft. The method is used where the spacecraft 12 includes an open systems interconnect architecture or protocol stack 310 including (a) a physical layer 312 which defines the hardware by which the signals are routed, (b) a link layer 314 which defines the handling of a packet of information within object 210 in the current data link, (c) a network layer 316 which defines the complete routing path for the data over multiple links, (d) a transport layer 318 which defines at least network congestion control, and (e) an application layer 320 which uses, or is at least capable of using, software-defined executable code. The method includes the step of generating data 212, together with at least one method comprising a protocol 214, 216, where the protocol 214, 216 includes executable code implementing at least the data protocol of the data 212. The object 210 comprising the data 212 and the protocol 214, 216 are transmitted to the spacecraft 12 from an earth station 14, 16, and in the alternative, from another spacecraft (not illustrated). The object 210 comprising data 212 and the executable code 214, 216 is received at the spacecraft 12 to thereby generate received signals. At the spacecraft 12, at least the executable code (at least a portion of one of 214 and 216) is extracted from the received signals, and temporarily stored in memory 120. At the spacecraft 12, the code is executed for implementing at least one layer in accordance with an OSI reference model, for example, at least one of (a) the network layer 316, (b) the transport layer 318, and (c) the application layer 320.

In an advantageous embodiment of the invention, the step of executing the executable code includes the step of adapting the network layer 316 for at least one of Internet Protocol and asynchronous transfer mode protocol. In another embodiment, the step of executing the executable code includes at least one of the steps of data fusion and packet dropping.

In another aspect of the invention, in a spacecraft-based multicasting system, wherein an earth station transmits to the spacecraft data packets to be multicast, together with a protocol data unit associated with each packet, the protocol data unit includes information defining one or more multicast regions to which at least the data of the packet, or the packet itself, is to be transmitted.

What is claimed is:

1. A method for dynamically configuring a satellite to communicate over a network comprising at least one earth station and at least one satellite in accordance with an open system interconnection (OSI) reference model, the method comprising:

transmitting an object from an earth station to a satellite, said object comprising data conforming to at least one protocol and said object further comprising executable code for implementing said protocol at said satellite;
receiving said object at said satellite;
extracting at least said executable code from said object at said satellite;
temporarily storing at least said executable code in memory at said satellite;
dynamically configuring the satellite to support the OSI reference model using said executable code; and
executing said executable code for implementing at the satellite at least one layer of the OSI reference model, including replacing existing network layer protocol with at least one of internet protocol and asynchronous transfer mode protocol.

2. The method according to claim 1, wherein said at least one layer comprises a physical layer and a data link layer.

3. The method according to claim 1, wherein said at least one layer comprises a network layer.

4. The method according to claim 1, wherein said at least one layer comprises a transport layer.

5. The method according to claim 1, wherein said at least one layer comprises an application layer.

6. The method according to claim 1, wherein said step of executing said executable code includes at least one of the steps of data fusion and packet dropping.

\* \* \* \* \*